(12) United States Patent
Jurisch et al.

(10) Patent No.: US 9,355,512 B2
(45) Date of Patent: May 31, 2016

(54) CLOSING UNIT, CLOSING APPARATUS, AND METHOD FOR UNLOCKING AND/OR LOCKING A LOCK

(71) Applicant: micro-sensys Gmbh, Erfurt (DE)

(72) Inventors: Reinhard Jurisch, Meckfeld bei Bad Berka (DE); Peter Peitsch, Erfurt (DE)

(73) Assignee: micro-sensys GmbH, Erfurt (DE)

( * ) Notice: Subject to any disclaimer, the term of this patent is extended or adjusted under 35 U.S.C. 154(b) by 0 days.

(21) Appl. No.: 14/083,096

(22) Filed: Nov. 18, 2013

(65) Prior Publication Data

US 2014/0138439 A1    May 22, 2014

(30) Foreign Application Priority Data

Nov. 16, 2012   (DE) .......................... 10 2012 221 016

(51) Int. Cl.
*G06K 5/00*      (2006.01)
*G07C 9/00*      (2006.01)
*H04W 12/06*     (2009.01)

(52) U.S. Cl.
CPC ........ *G07C 9/00706* (2013.01); *G07C 9/00309* (2013.01); *G07C 9/00944* (2013.01); *H04W 12/06* (2013.01); *H04L 2209/805* (2013.01); *Y02B 60/50* (2013.01)

(58) Field of Classification Search
CPC .............. G07C 9/00309; G07C 9/006858; G07C 2009/00634; H04W 12/06; H04L 2009/805; Y02B 60/50
USPC ....................................................... 235/382
See application file for complete search history.

(56) References Cited

U.S. PATENT DOCUMENTS

| | | | | |
|---|---|---|---|---|
| 5,531,086 A | * | 7/1996 | Bryant | ................. 70/279.1 |
| 5,613,012 A | * | 3/1997 | Hoffman | ............ G06F 21/32 |
| | | | | 235/380 |
| 2004/0201451 A1 | * | 10/2004 | Sugimoto | ........... B60R 25/406 |
| | | | | 340/5.62 |
| 2005/0252260 A1 | * | 11/2005 | Chu | ......................... 70/262 |
| 2007/0056338 A1 | * | 3/2007 | Sabo et al. | ................ 70/257 |
| 2009/0195974 A1 | * | 8/2009 | Rambosek | ............ G06F 1/1626 |
| | | | | 361/679.32 |
| 2010/0073129 A1 | * | 3/2010 | Pukari | ................... 340/5.8 |
| 2010/0171589 A1 | * | 7/2010 | Haberli | ................. 340/5.82 |
| 2010/0201482 A1 | * | 8/2010 | Robertson et al. | ......... 340/5.61 |
| 2012/0132710 A1 | * | 5/2012 | Loeffler | .......... G06K 19/0707 |
| | | | | 235/439 |

(Continued)

FOREIGN PATENT DOCUMENTS

| | | | |
|---|---|---|---|
| DE | 199 16 039 A1 | 10/2000 |
| DE | 10 2009 019 657 A1 | 8/2011 |
| KR | 10 2010 0 113 872 A | 10/2010 |

(Continued)

*Primary Examiner* — Steven S Paik
*Assistant Examiner* — Asifa Habib
(74) *Attorney, Agent, or Firm* — Muncy, Geissler, Olds & Lowe, P.C.

(57) ABSTRACT

A closing unit, closing apparatus, and method for locking and/or unlocking a lock is provided. The closing unit can include an actuator for moving or for blocking and releasing a locking and unlocking unit of the lock, an electrical energy supply arrangement, a switch between the electrical energy supply arrangement and the actuator, an encryption/decryption unit, a key memory, as well as a passive RFID basic circuit having an antenna, where at least the actuator, the switch between the electrical energy supply arrangement and the actuator, the encryption/decryption unit, and the key memory are disposed in a housing that cannot be opened without destroying it.

11 Claims, 6 Drawing Sheets

(56) References Cited

U.S. PATENT DOCUMENTS

2013/0063248 A1* 3/2013 Coutermarsh et al. ....... 340/5.73
2013/0259232 A1 10/2013 Petel

FOREIGN PATENT DOCUMENTS

| WO | WO 2011/065892 A1 | 6/2011 |
| WO | WO 2012/041885 A1 | 4/2012 |

* cited by examiner

CLOSING UNIT, CLOSING APPARATUS, AND METHOD FOR UNLOCKING AND/OR LOCKING A LOCK

This nonprovisional application claims priority under 35 U.S.C. §119(a) to German Patent Application No. DE 10 2012 221 016.4, which was filed in Germany on Nov. 16, 2012, and which is herein incorporated by reference.

BACKGROUND OF THE INVENTION

1. Field of the Invention

The present invention relates to a closing unit and to a method for unlocking and/or locking a lock.

2. Description of the Background Art

From the conventional art, closing systems for doors are known in general, which systems use a transponder as a key for controlling access monitoring. The related reader is situated in the lock of the door or also in the wall next to the lock. Operation of the reader requires an energy supply, either by way of a local energy supply network or by way of batteries. The reader of the closing system of the respective door must be programmed with the transponders that are supposed to allow access through the respective door. Different solutions exist here, where in general, a distinction is made between offline and online systems. In the case of online systems, the readers are connected with an installed data network, which permits reprogramming of the readers at any time, by means of a control computer, or the control computer itself controls access. In the case of offline systems, the readers are not connected with a data network; here, a usual programming method is the use of what is called a master card, which then programs subsequent transponders held in front of the reader, as access-authorized transponders, into a data memory of the reader.

SUMMARY OF THE INVENTION

The invention is based on the task of indicating an improved closing unit, an improved closing apparatus, and an improved method for unlocking and/or locking of a lock.

A closing unit for a lock, according to an embodiment of the invention, comprises an actuator for moving or for blocking and releasing a locking and unlocking unit of the lock, an electrical energy supply arrangement, an electrical switch between the electrical energy supply arrangement and the actuator, an encryption/decryption unit, a key memory, as well as a passive RFID basic circuit having an antenna, where at least the actuator, the electrical switch between the electrical energy supply arrangement and the actuator, the encryption/decryption unit, and the key memory are disposed in a housing that cannot be opened without destroying it.

The closing unit according to the invention can be a crypto-actuator, also called an integral RFID crypto-actuator.

In this connection, the term RFID stands for "radio-frequency identification" and refers to a wireless data transmission method based on electromagnetic waves, i.e. a radio-based data transmission method, for which an RFID transponder and an RFID reader, also called an RFID reader, is required. In this connection, the RFID transponder is addressed by means of radio signals transmitted to it by the RFID reader. It usually responds by means of transmitting a unique identification code and, if necessary, additional information. The passive RFID basic circuit is the actual passive RFID transponder or at least a part of the passive RFID transponder.

The closing unit can also work on the basis of NFC (Near Field Communication), where NFC is a special application of RFID. RFID works at different frequencies. NFC is fixed at one of these frequencies; it works at a carrier frequency of 13.56 MHz.

By means of the solution according to the invention, the system known from the state of the art, in which a reader is disposed in the lock and a transponder is used as a key, is reversed. I.e. the closing unit is the RFID transponder or comprises at least the RFID transponder. As a result, reliability is significantly improved in comparison with the closing systems known from the state of the art, which are based on transponder technology, and a significant cost reduction is achieved, where the security of control of respective monitoring by means of the solution according to the invention is at the same level as in the closing systems known from the state of the art, or is improved as compared with these closing systems known from the state of the art. This is achieved in that all the essential components of the closing unit are disposed in the housing of the closing unit, which cannot be opened without destroying it, i.e. the components are encapsulated in the housing, which can only be opened by destroying it. Manipulation of the closing unit without destruction of the housing is therefore not possible. For this reason, unnoticed manipulations and resulting unauthorized opening of the respective lock are precluded. Even destruction of the housing, in order to force the respective lock to open by force, by an unauthorized person, is not possible with a corresponding configuration of the housing, or at least possible only with significant effort, and would lead to complete destruction, for example, and thereby to inability of the closing unit to function. In comparison with the state of the art, the closing unit demonstrates significantly less production effort, installation effort, maintenance effort, and energy demand.

The closing unit according to an embodiment of the invention can be used, for example, in and/or on a lock of a door, of a safe, of a suitcase or in and/or on a plurality of other locks. For example, the closing unit can be configured in the form of a standard lock, for example in the form of a cylinder lock, so that such a standard lock in a door, for example, can be replaced with the closing unit.

The actuator of the closing unit can be coupled, for example by way of a locking or blocking apparatus that is passed out of the housing of the closing unit, either with the locking and unlocking unit of the lock, in such a manner that a movement of the actuator can be transferred to the locking and unlocking unit of the lock by way of the mechanical locking or blocking apparatus, so that the locking and unlocking unit of the lock can be moved by way of the actuator, i.e. the lock can be actively closed and opened by means of the actuator, or by means of a movement of the mechanical locking or blocking apparatus brought about by means of the actuator, the locking and unlocking unit of the lock, i.e. the latch of the lock, can be locked and unlocked, i.e. blocked and released, so that a manual movement of the locking and unlocking unit of the lock, for example, can be blocked or released.

The electronic circuit parts of the closing unit can be integrated into multiple semiconductor chips or, in particularly advantageous manner, into one semiconductor chip. The semiconductor chip is advantageously what is called an ASIC (application-specific integrated circuit), i.e. an application-specific integrated circuit, also called a Custom Chip. This is a cost-advantageous solution and furthermore demonstrates great security, since the function of the ASIC cannot be manipulated.

By means of the configuration of the RFID basic circuit as a passive RFID basic circuit, the closing unit is configured as a passive RFID transponder or comprises a passive RFID transponder. Such a passive RFID transponder does not have its own energy supply, i.e. has no battery, but rather, electrical energy is transferred to the RFID transponder by induction, by means of electromagnetic waves transmitted by the RFID reader. The closing unit according to the invention is therefore a passive crypto-actuator, also called a passive integral RFID crypto-actuator. This passive configuration of the closing unit is particularly advantageous, because in this manner, the closing unit does not have its own electrical energy source, for example in the form of a battery, and also is not connected to an energy source, for example to a local energy supply network. A significant advantage of this embodiment of the closing unit without an internal energy source and without cable-connected coupling to an external energy supply network is its very great reliability, which is comparable to that of a mechanical lock. Failure due to a dead battery cannot occur and therefore also does not require any special precautions, which would reduce the security level. Because of the passive construction, the circuit is almost never under voltage and in operation; there are hardly any aging processes that could lead to failures. A failure of the closing unit is therefore not more likely than a failure of a mechanical lock, for example due to the key breaking off.

The passive RFID basic circuit is also called an RFID front-end and comprises only the components of the passive RFID transponder that are required for data exchange and for energy exchange. In this connection, it is practical if the electrical energy supply arrangement of the closing unit has only the energy supply that is passed out of the passive RFID basic circuit and brought up to the electrical switch, so that the entire closing unit is supplied with energy by way of the reader, in the manner described. I.e. it is practical if the electrical energy supply arrangement is formed merely by means of at least one electrical connection between the passive RFID basic circuit and the electrical switch.

The electrical energy transmitted to the RFID transponder by induction, by means of electromagnetic waves emitted by the RFID reader, can be stored in an electrical short-term interim energy storage device, particularly stored on an interim basis for a short time. Particularly preferably, the electrical energy transmitted to the RFID transponder by induction, by means of electromagnetic waves emitted by the RFID reader, is capacitatively stored in a capacitor of the RFID transponder, particularly stored on an interim basis for a short time. For this purpose, the energy supply arrangement of the closing unit then advantageously comprises, in this case, not only at least one electrical connection between the passive RFID basic circuit and the electrical switch, but rather at least one short-term interim energy storage device, configured as a capacitor, which is connected with the passive RFID basic circuit and the electrical switch by way of corresponding electrical connections. In this capacitor, the electrical energy transmitted to the RFID transponder by induction, by means of the electromagnetic waves emitted by the RFID reader, can be stored capacitatively, particularly stored capacitatively on an interim basis for a short time. Alternatively or additionally, the energy supply arrangement of the closing unit can also, for example, comprise at least one electrical short-term interim storage device for storing energy, configured as a rechargeable battery, particularly for short-term interim energy storage of the electrical energy transmitted to the RFID transponder by induction, by means of electromagnetic waves emitted by the RFID reader.

It is practical if charging of the electrical short-term interim energy storage device takes place exclusively by means of the RFID reader, by way of the passive RFID basic circuit, during respective activation of the closing unit by means of the RFID reader, in other words during a respective locking process. Such a charging process preferably lasts for less than two seconds. The electrical short-term interim energy storage device only serves for interim storage for a slightly larger amount of energy than is usually available in chip-integrated capacitors in RFID basic circuits. These usually have a capacity of 1 nF. An electrical short-term interim energy storage device configured as a capacitor has a capacity of greater than 100 nF, for example, for this purpose, i.e. for the aforementioned interim storage of the slightly greater amount of energy. The passive energy supply of the closing unit, which also comprises at least one electrical short-term interim energy storage device, if necessary, is therefore also an essential characteristic of the closing unit, along with installation of the closing unit directly in the and/or on the respective lock and, in particular, along with the housing of the closing unit, which cannot be opened without destroying it, in which housing, in particular, the key memory, the encryption/decryption unit, the actuator, and the switch for activation of the actuator are disposed in manipulation-secured manner.

In order to ensure that the electrical short-term interim energy storage device is charged sufficiently, so that a sufficient amount of energy for activation of the actuator is available, a charging time for charging the electrical short-term interim energy storage device is predetermined, so that activation of the switch, in order to thereby activate the actuator with the electrical energy stored in the electrical short-term interim energy storage device on an interim basis, takes place only after this predetermined charging time has elapsed. However, since the energy transfer from the reader to the passive RFID basic circuit of the closing unit and thereby charging of the electrical short-term interim energy storage device is dependent on the distance of the reader from the closing unit, a correspondingly long charging time must be set, in order to ensure that the electrical short-term interim energy storage device is sufficiently charged under all conditions, before activation of the switch of the closing unit takes place.

In order to activate the switch of the closing unit as quickly as possible, so that the actuator moves or blocks and releases the locking and unlocking unit of the lock as quickly as possible, the closing unit, in a particularly advantageous embodiment, has a charging status monitor of the electrical short-term interim energy storage device. In this manner, the switch and thereby the actuator can be activated immediately when the electrical short-term interim energy storage device has reached a predetermined minimum charging level that is sufficient to activate the actuator with the energy stored in the electrical short-term interim energy storage device. In this manner, a time span between establishing the connection between the reader and the closing unit and moving or blocking and releasing the locking and unlocking unit of the lock by means of the actuators is shortened to a minimum under all conditions.

In an embodiment, the charging status of the electrical short-term interim energy storage device determined by means of the charging status monitor can also be transmitted to the reader by the closing unit. In this manner, the user receives information that charging of the energy storage device is functioning properly and that the actuator is moving or blocking and releasing the lock. Furthermore, by means of transmitting the current charging state of the electrical short-term interim energy storage device to the reader, the switch of the closing unit could be activated for activation of the actuator, alternatively for automatic activation when the predetermined charging state is reached, for example also by the user, by way of the reader.

The closing unit can function as a passive transponder with an integrated actuator. The energy supply takes place exclusively from the outside, by way of the RFID reader, which is configured, for example, as a mobile communication device, for example as a mobile telephone. Only the RFID reader serves as an energy source for the closing unit. The energy transferred from this energy source, i.e. from the RFID reader, to the closing unit can be put into interim storage for a short time, if an electrical short-term interim energy storage device is present in the closing unit, to be used for directly subsequent procedures of the closing unit. The closing unit is without energy during the remaining time, with the resulting advantages as compared with a battery-supplied closing system or one supplied by a local energy supply network, for example very great reliability, which is comparable to that of a mechanical lock. Failure due to a dead battery cannot occur, and therefore also does not require any special precautions, which would reduce the security level. Because of the passive construction, the circuit is almost never under voltage and in operation; there are therefore hardly any aging processes that could lead to failures. Failure of the closing unit is therefore not more likely than failure of a mechanical lock, for example due to the key breaking off.

The actuator, which is also called an actuator, can be configured as an electric motor, as an electromagnet or as a piezo-element, i.e. as a piezo-actuator. With such actuators, a small construction and energy-saving operation are possible, so that the electrical energy transmitted by the RFID reader is sufficient for its operation. If necessary, the energy transmitted by the RFID reader should be stored in the electrical short-term interim energy storage device on an interim basis for a short time, at first, in the manner described above, in order to ensure a sufficient energy supply for the actuator. The appropriate embodiment of the actuator mechanism, in each instance, should be used, depending on the configuration of the closing unit and depending on whether the locking and unlocking unit of the lock is to be actively moved or merely blocked and released by the actuator mechanism.

In an embodiment, the closing unit comprises a sensor for monitoring the movement or the blocking and release of the locking and unlocking unit of the lock. In this way, the functional reliability of the closing unit is further improved. By means of the sensor, information concerning a current locking state can be transmitted to the RFID reader by way of the contact-free interface. In this manner, it can be detected whether the actuator was actually activated and the lock was released. The sensor can be configured, for example, as a reed sensor, i.e. as a reed contact that is activated only in the event of a correct movement of the actuator or of the locking and unlocking unit of the lock and passes a switching signal on to the circuit of the closing unit. Subsequently, this signal is then transmitted to the reader by way of the contact-free interface, and can then be displayed to a respective user. If an energy supply is required for the sensor, this can also take place by way of the reader and the passive RFID basic circuit, analogous to the energy supply to the other components of the closing unit already described above, either directly, i.e. without interim energy storage, or, if applicable, also from the electrical short-term interim energy storage device, if this is present.

Advantageously, the closing unit comprises an optical, acoustical and/or haptic output unit for output of a sensor result of the sensor. In this manner, this signal of the sensor, alternatively or in addition to transmission to the RFID reader, is output directly to the closing unit by means of the output unit, and the information is transmitted to the user in this manner. Such an optical display unit can be configured, for example, as a light-emitting diode (LED). An energy supply of the optical, acoustical and/or haptic output unit can also take place by way of the reader and the passive RFID basic circuit, analogous to the energy supply of the other components of the closing unit already described above, either directly, i.e. without interim energy storage, or, if applicable, also from the electrical short-term interim energy storage device, if this is present.

It is practical if the housing is configured from metal and/or from plastic. A housing made of metal can be configured in particularly stable manner, so that destruction of the housing, in order to force opening of the lock in this manner, is impossible or at least made significantly more difficult. A housing made of plastic can also have sufficient stability. In particular, however, a housing made of plastic can also be configured in such a manner that it cannot be opened without destroying it, so that manipulation or intended manipulation is immediately evident. Furthermore, a housing made of plastic has the advantage that the antenna of the closing unit can also be disposed in the housing, where no significant reduction of the reception of the antenna caused by the housing occurs. Even in the case of a housing configured from metal, the antenna can be disposed in the housing, but the reception of the antenna is severely impaired by the metal housing.

Also, a combination of metal and plastic for configuration of the housing is possible, for example a metal housing lined with plastic, for example cast epoxy resin. This has the particular advantage that all the components of the closing unit enclosed in the housing are connected with one another with material fit, by means of being cast in plastic, so that even if the housing is opened as the result of its destruction, targeted manipulation of individual parts of the closing unit is prevented. This would lead to destruction of the circuit of the closing unit and thereby to complete inability of the latter to function. Also in the case of a housing that is configured only from plastic, the components of the closing unit disposed in the housing can be enclosed in the housing in this manner. For example, the housing can be configured as an injection-molded part, where the components of the closing unit to be enclosed in the housing have the plastic for forming the housing injection-molded around them. In this manner, these components are connected with the housing with material fit, and the housing is configured as a one-piece capsule that can only be opened by destroying it.

A closing apparatus according to the invention comprises at least one such closing unit and at least one reader, particularly an RFID reader, also called an RFID reader. In this manner, the lock in and/or on which the closing unit is disposed can be opened, using the reader, by means of transmission of a respective correct key to the closing unit. Transmission of the key takes place, in this connection, by way of a wireless communications connection, i.e. by way of a wireless and contact-free communications interface, an RFID radio communications interface between the RFID reader and the closing unit, which is configured as an RFID transponder or comprises such a transponder. Using the closing apparatus according to the invention, comprising the closing unit, the advantages that have already been described with regard to the closing unit can be achieved.

In particular, the closing unit is supplied with electrical energy by the reader, in the manner already described, so that no energy supply by means of a connection to a local energy supply network is required for the closing unit. Furthermore, the closing unit also does not have its own energy source, for example in the form of a battery or in the form of a rechargeable battery to be recharged externally, which is exhausted after a specific period of operation, i.e. after a plurality of locking procedures, and must be replaced or removed and recharged. At most for short-term interim energy storage, the closing unit can have an electrical short-term interim energy storage device, which can be charged directly, in each instance, by means of the electrical energy transmitted to the closing unit by the reader. This energy then serves, in each instance, merely for direct subsequent activation of the actuators and any procedures that might be related with that, for example operation of the sensor for monitoring movement or blocking and releasing the locking and unlocking unit of the lock and for output and/or transmission of the sensor result to the reader.

In an embodiment, the reader is configured as a mobile communications device or integrated into a mobile communications device. The mobile communications device is configured, for example, as a mobile telephone, particularly as what is called a smartphone. Furthermore, the mobile communications device can also be configured, for example, as a portable computer, for example as what is called a handheld computer or PDA. In the case of such mobile communications device, in particular, an NFC interface (Near Field Communication) is already widespread, so that these mobile communications devices are well suited as readers for the closing apparatus. In this manner, cost-intensive special readers are not required, but rather a communications device that the respective user already has can be used, for example his mobile telephone. The RFID reader and the closing unit then work as an NFC reader and NFC transponder, i.e. at the frequency of 13.56 MHz.

In an embodiment of the closing apparatus, the closing apparatus comprises, along with the closing unit and the reader, which is particularly configured as an RFID reader, a separate transponder with a key for authentication of the reader with regard to the closing unit. In the other embodiments described above, the key and the encryption unit that match the closing unit and its key and encryption/decryption unit, or are identical with them, are stored or present in the reader. In this embodiment, the reader, which is configured as a mobile communications device, for example, itself does not have a key for authentication with regard to the closing unit, but rather merely serves for transmission of the key from the separate transponder to the closing unit. The key is stored in the separate transponder. The latter possibly also has the encryption unit. Furthermore, the reader makes the electrical energy supply for the closing unit available by means of the energy transfer to the closing unit described above.

The key stored in the separate transponder is transmitted to the closing unit by means of the reader, for example by the mobile communications device configured as a mobile telephone or PDA. In this case, the reader communicates not only with the closing unit but also with the separate transponder. In this manner, no encryption function is required in the reader itself; this function is restricted to the separate transponder.

This is advantageous, for example, if the closing unit is to be used only for a short time by a great number of users. For example, the closing unit is integrated into a lock of a door of a hotel room. The hotel then merely has to issue the separate transponder that matches the closing unit to the respective user, for example to the respective hotel guest. Then the private mobile telephone of the respective hotel guest can be used as a reader, particularly an RFID reader, for example. This reader does not need to be reprogrammed as the result of the use of the separate transponder.

It is practical if the separate transponder is configured as an RFID transponder. For transmission of the key from the separate transponder to the reader and from the latter to the closing unit, the separate transponder and the closing unit must be in the RFID field of the reader at the same time, for example. The reader serves as a transmission apparatus for the key data from the separate transponder to the closing unit, using an anti-collision function, by way of the RFID interface. Alternatively, the key can be transmitted to the reader by radio, i.e. by way of a contact-free data transmission method that deviates from RFID, for example Bluetooth, and then transmitted from the reader to the closing unit by way of the RFID interface, in practical manner.

In a method for unlocking and/or locking of a lock by means of such a closing apparatus, according to the invention, a bidirectional communications connection between the reader and the closing unit is established, where the reader authenticates itself with regard to the closing unit and where after successful authentication, the electrical switch of the closing unit is activated, in order to move or block and release the locking and unlocking unit of the lock by means of the actuator. The method allows a reliable locking and opening function of the respective lock, with the advantages that were already described with regard to the closing apparatus and the closing unit, which are required for implementation of the method.

For opening of the lock, the reader must be brought into the functional range of the antenna of the closing unit and activated. For example, the mobile communications device must be brought into the functional range of the antenna of the closing unit, and the transponder/reader of the latter, i.e. RFID reader, must be activated, for example after activation of a keypad function or by means of constant polling. Subsequently, bidirectional communication between the reader and the closing unit, i.e. the passive crypto-actuator, is established. It is practical if this communication begins with authentication of the reader, i.e. the reader must prove that access to the data memory and/or the electrical switch of the passive crypto-actuator is permitted. For this purpose, the methods usually used in transponder technology are applied, e.g. password or challenge/response method. Optionally, authentication of the closing unit with regard to the reader, in other words reciprocal authentication of both partners, can be implemented. After successful authentication, subsequently the electrical switch can be activated by means of further communication, which is also encrypted cryptographically in order to increase the level of security, so that the actuator moves or at least releases the locking and unlocking unit of the lock. After this release of the locking and unlocking unit of the lock, for example in the case of a door lock, the door can be opened, for example by activating a door knob, for example by turning the door knob. Locking of the lock, for example by means of blocking the locking and unlocking unit of the lock, takes place in the same manner.

In an embodiment of the method, the reader authenticates itself with regard to the closing unit by means of a key that is transmitted to the reader by a separate transponder and from the reader to the closing unit. In this manner, it is not necessary for the reader, which is configured, for example, as a mobile communications device, to itself have a key for authentication with regard to the closing unit, but rather the reader, particularly RFID reader, merely serves for transmission of the key from the separate transponder to the closing unit, and furthermore makes the electrical energy supply for the closing unit available by means of the energy transfer to the closing unit as described above. In this case, the reader communicates not only with the closing unit but also with the separate transponder. In this manner, no encryption function is required in the reader itself; this function is restricted to the separate transponder.

This is advantageous, for example, if the closing unit is to be used only for a short time by a great number of users. For example, the closing unit is integrated into a lock of a door of a hotel room. The hotel then merely has to issue the separate transponder that matches the closing unit to the respective user, for example to the respective hotel guest. The private mobile telephone of the respective hotel guest can then be used as a reader, particularly an RFID reader, for example. This reader does not have to be reprogrammed as the result of the use of the separate transponder.

It is practical if the separate transponder is configured as an RFID transponder. For transmission of the key from the separate transponder to the reader and from the latter to the closing unit, for example, the separate transponder and the closing unit are brought into the RFID field of the reader at the same time, by means of corresponding positioning of the reader and of the separate transponder close to the closing unit. The reader serves as a transmission apparatus for the key data from the separate transponder to the closing unit, using an anti-collision function, by way of the RFID interface. Alternatively, the key can be transmitted to the reader by radio, i.e. by way of a contact-free data transmission method that deviates from RFID, for example Bluetooth, and then transmitted from the reader to the closing unit by way of the RFID interface, in practical manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
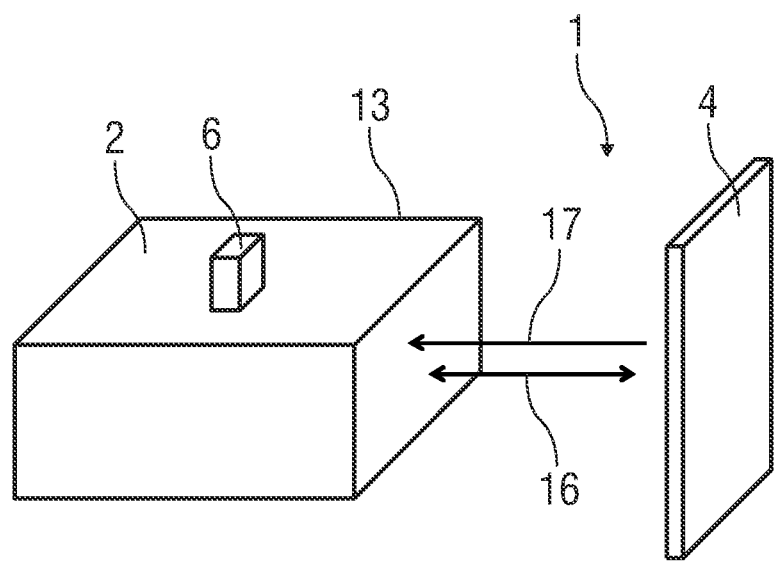
FIG. 1 shows schematically, an embodiment of a closing apparatus.
Figure 2:
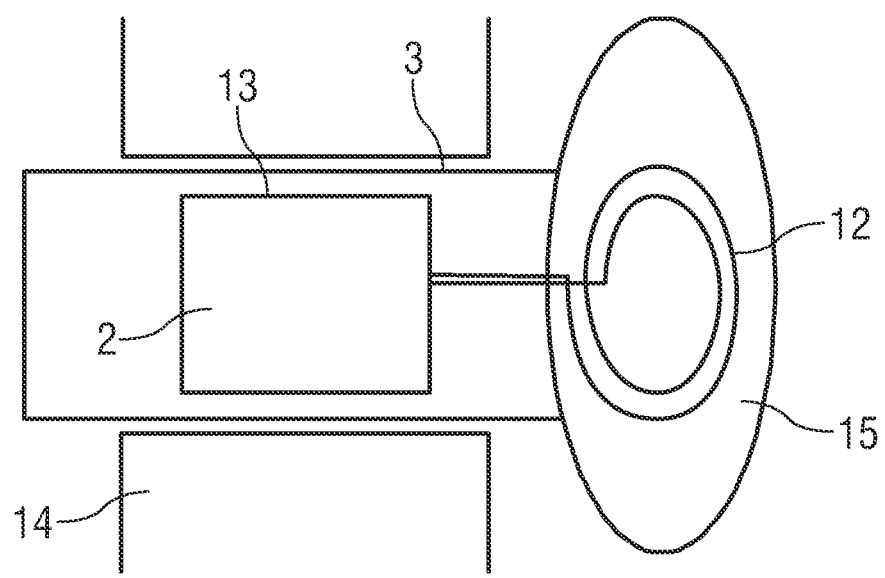
FIG. 2 shows schematically, an embodiment of a closing unit.
Figure 3:
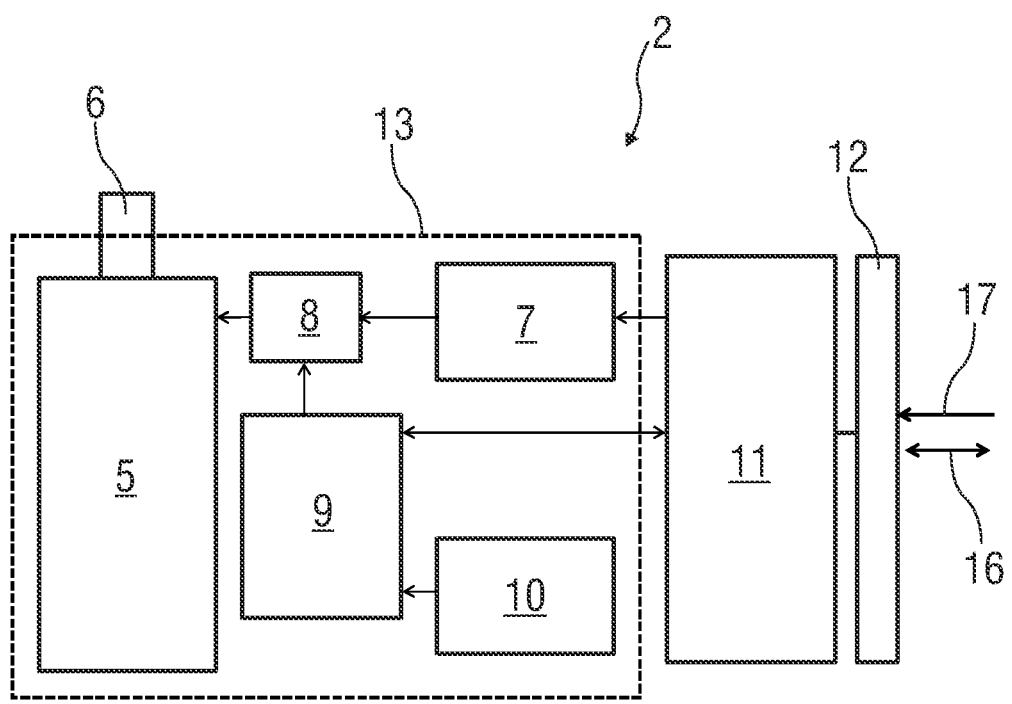
FIG. 3 shows schematically, a detailed representation of an embodiment of a closing unit.
Figure 4:
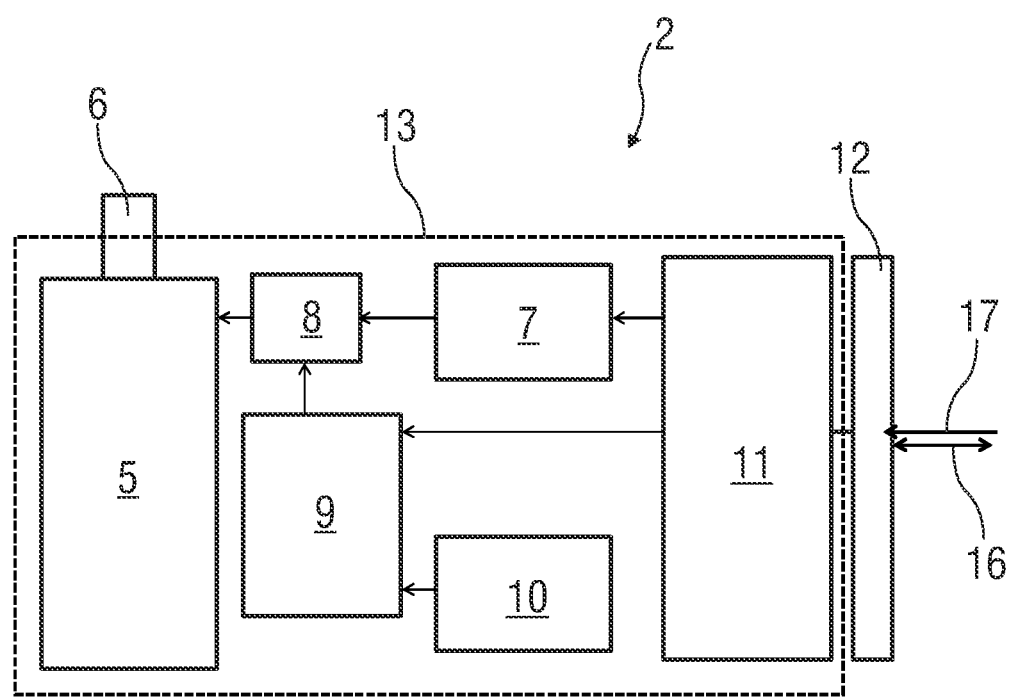
FIG. 4 shows schematically, a detailed representation of a further embodiment of a closing unit.
Figure 5:
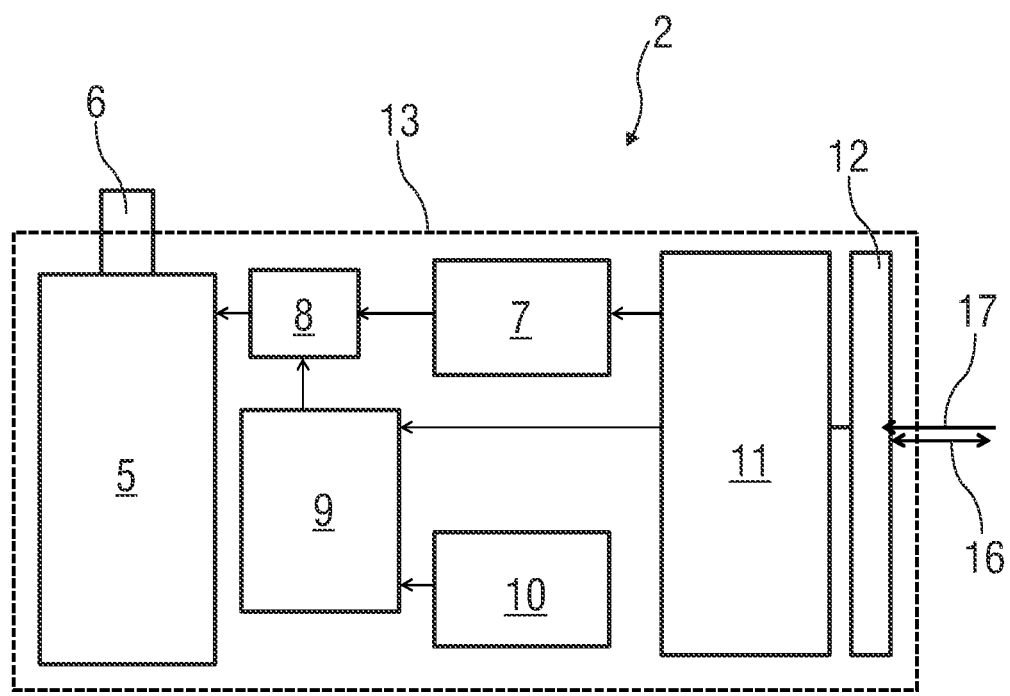
FIG. 5 shows schematically, a detailed representation of a further embodiment of a closing unit.
Figure 6:
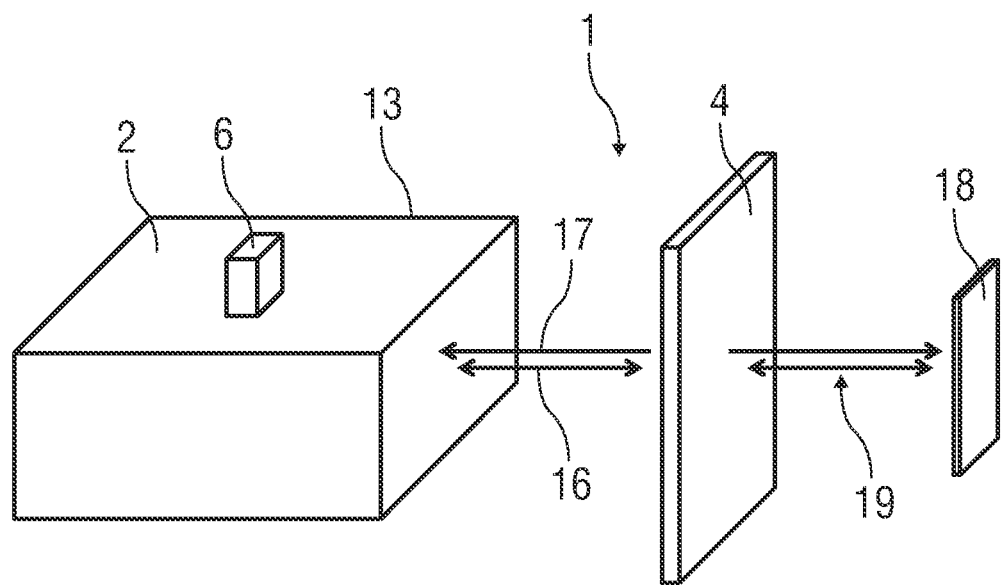
FIG. 6 shows schematically, a further embodiment of a closing apparatus.

FIG. 1 schematically shows an embodiment of a closing apparatus 1. The closing apparatus 1 comprises a closing unit 2 for a lock 3. The closing unit 2 is also referred to as a passive crypto-actuator or a passive integral RFID crypto-actuator. Furthermore, the closing apparatus 1 comprises a reader 4. The reader 4 is configured as an RFID reader, also called an RFID reader. The closing apparatus 1 is suitable, for example, for a lock 3 shown in FIG. 2, configured as a door lock, where the closing unit 2 of the closing apparatus 1 is a component of the door lock. For this purpose, the closing unit 2 can be configured, for example, in the form of a cylinder lock, so that a conventional mechanical cylinder lock can be replaced with the closing unit 2. In FIGS. 3 to 5, different embodiments of the closing unit 2 are shown schematically. FIG. 6 schematically shows a further embodiment of the closing apparatus 1. For activation of the closing unit 2 with the reader 4, it is necessary to establish a contact-free communications interface between the reader 4 and the closing unit 2, i.e. an RFID radio communications interface. The closing unit 2 is configured as a passive RFID transponder or comprises a passive RFID transponder.

The closing unit 2 comprises an actuator 5 for moving or for blocking and releasing a locking and unlocking unit of the lock 3, not shown in any detail here. This locking and unlocking unit of the lock 3 is also referred to as the latch of the lock 3. For this purpose, the actuator 5 in the example shown here is either coupled with the locking and unlocking unit of the lock 3 in such a manner that a movement of the actuator 5 by way of a mechanical locking or blocking apparatus 6 can be transferred to the locking and unlocking unit of the lock 3, by way of the mechanical locking or blocking apparatus 6, so that the locking and unlocking unit of the lock 3 can be moved by the actuator 5, i.e. the lock 3 can be actively locked and opened by means of the actuator 5, or the locking and unlocking unit of the lock 3, i.e. the latch of the lock 3, can be blocked and unblocked, i.e. blocked and released, by means of a movement of the mechanical locking or blocking apparatus 6 brought about by means of the actuator 5, so that manual movement of the locking and unlocking unit of the lock 3 is blocked or released, for example.

Furthermore, the closing unit 2 comprises an electrical energy supply arrangement 7, an electrical switch 8 between the electrical energy supply arrangement 7 and the actuator 5, an encryption/decryption unit 9, a key memory 10, as well as a passive RFID basic circuit 11 having an antenna 12.

At least the actuator 5, the electrical switch 8 between the electrical energy supply arrangement 7 and the actuator 5, the encryption/decryption unit 9, and the key memory 10 are disposed in a housing 13 that cannot be opened without destroying it. In the embodiment shown in FIG. 3, the electrical energy supply arrangement 7 is furthermore also disposed in the housing 13. In the embodiment shown in FIG. 4, the passive RFID basic circuit 11 is also disposed in the housing 13, and in the embodiment shown in FIG. 5, all the components of the closing unit 2 are disposed in the housing 13, in other words also the antenna 12.

As has already been mentioned, the RFID basic circuit 11 is a passive RFID basic circuit 11. I.e. the closing unit 2 comprises a passive RFID transponder. Such a passive RFID transponder does not have its own electrical energy supply, i.e. has no battery, but rather electrical energy must be transmitted to the RFID transponder by induction, by means of electromagnetic waves emitted by the RFID reader. Therefore the closing unit 2 is a passive crypto-actuator, also referred to as a passive integral RFID crypto-actuator.

This passive configuration of the closing unit 2 is particularly advantageous, because in this manner the closing unit 2 does not have its own electrical energy source, for example in the form of a battery, and is also not connected to an energy source, for example to a local energy supply network. A significant advantage of this embodiment of the closing unit 2 without an internal energy source and without cable-connected coupling to an external energy supply network is its very great reliability, which is comparable to that of a mechanical lock. Failure due to a dead battery cannot occur, and therefore also does not require any special precautions, which would reduce the security level. Because of the passive construction, the circuit is almost never under voltage and in operation; there are therefore hardly any aging processes that could lead to failures. Failure of the closing unit 2 is therefore not more likely than failure of a mechanical lock, for example due to the key breaking off.

The passive RFID basic circuit 11 is also referred to as an RFID front-end and comprises only the components of the passive RFID transponder that are required for data exchange and for energy exchange. In this connection, the electrical energy supply arrangement 7 of the closing unit 2 can consist merely of the energy supply brought out of the passive RFID basic circuit 11 and passed to the electrical switch 8, i.e. of merely at least one electrical connection between the passive RFID basic circuit 11 and the electrical switch 8, for example, so that the entire closing unit 2 is supplied with electrical energy, which is not stored on an interim basis in the closing unit 2, by way of the reader 4. Advantageously, however, the electrical energy supply arrangement 7 can have an electrical short-term interim energy storage device, for example, which is particularly preferably configured as a capacitor, for short-term interim energy storage.

In this way, the electrical energy transmitted to the RFID transponder, i.e. to the passive RFID basic circuit 11, by induction, by means of electromagnetic waves emitted by the RFID reader, can be capacitatively stored in the electrical short-term interim energy storage device of the electrical energy supply arrangement 7 of the closing unit 2, configured as a capacitor, particularly stored capacitatively on an interim basis, for a short time. For this purpose, the energy supply arrangement 7 of the closing unit 2, as has already been mentioned, advantageously comprises at least one capacitor. Alternatively or additionally, the electrical energy supply arrangement 7 of the closing unit 2 can also, for example, comprise at least one electrical short-term interim energy storage device, configured as a rechargeable battery, for short-term interim energy storage of the electrical energy transmitted to the RFID transponder by induction, by means of electromagnetic waves emitted by the RFID reader.

It is practical if charging of the electrical short-term interim energy storage device takes place exclusively by means of the reader 4 configured as an RFID reader, by way of the passive RFID basic circuit 11, during respective activation of the closing unit 2 by means of the RFID reader, in other words during a respective closing procedure. Such a charging procedure preferably lasts for less than two seconds. The electrical short-term interim energy storage device serves only for interim storage for a slightly greater amount of energy than is usually available in chip-integrated capacitors in RFID basic circuits 11. These usually have a capacity of 1 nF. An electrical short-term interim energy storage device configured as a capacitor has a capacity, for the purpose of interim storage, for a slightly greater amount of energy, of greater than 100 nF, for example. The passive energy supply of the closing unit 2, the electrical energy supply arrangement 7 of which comprises at least one electrical short-term interim energy storage device, if applicable, is therefore an essential characteristic of the closing unit 2, along with the installation of the closing unit 2 directly in the and/or on the respective lock 3 and, in particular, along with the housing 13 of the closing unit 2 that cannot be opened without destroying it, in which, in particular, the key memory 10, the encryption/decryption unit 9, the actuator 5, and the switch 8 for activation of the actuators 5 are disposed in manipulation-secure manner.

In order to ensure that the electrical short-term interim energy storage device is sufficiently charged, so that a sufficient amount of energy is available for activation of the actuators 5, a charging time for charging of the electrical short-term interim energy storage device is predetermined, for example, so that the activation of the switch 8, in order to thereby activate the actuator 5 with the electrical energy temporarily stored in the electrical short-term interim energy storage device, only takes place after this predetermined charging time has elapsed. However, because the energy transfer from the reader 4 to the passive RFID basic circuit 11 of the closing unit 2 is dependent on the distance of the reader 4 from the closing unit 2, a correspondingly long charging time must be set, in order to ensure that the electrical short-term interim energy storage device is sufficiently charged under all conditions, before the switch 8 of the closing unit 2 is automatically activated.

In order to activate the switch 8 of the closing unit 2 as quickly as possible, so that the actuator 5 moves or blocks and releases the locking and unlocking unit of the lock 3 as quickly as possible, the closing unit 2, in a particularly advantageous embodiment, has a charging status monitor of the electrical short-term interim energy storage device. In this manner, the switch 8 and thereby the actuator 5 are automatically activated immediately, once the electrical short-term interim energy storage device has reached a predetermined minimum charging level, which is sufficient to activate the actuator 5 with the energy stored in the electrical short-term interim energy storage device. In this manner, a time span between establishing the connection between the reader 4 and the closing unit 2 and moving or blocking and releasing the locking and unlocking unit of the lock 3 by means of the actuator 5 is reduced to a minimum under all conditions.

In an advantageous embodiment, the charging status of the electrical short-term interim energy storage device determined by means of the charging status monitor can be transmitted, for example, from the closing unit 2 to the reader 4. In this manner the user receives the information that charging of the energy storage device is functioning properly, and that the actuator 5 is moving or blocking and releasing the lock 3. Furthermore, by means of transmission of the current charging status of the electrical short-term interim energy storage device to the reader 4, the switch 8 of the closing unit 2 could be activated by the user for activation of the actuator 5, for example, alternatively for automatic activation when the predetermined charging state is reached, by way of the reader 4.

The closing unit 2 functions as a passive transponder with an integrated actuator 5. The energy supply takes place exclusively from the outside, by way of the RFID reader, which is configured, for example, as a mobile communications device, for example as a mobile telephone. Only the RFID reader serves as the energy source for the closing unit 2. The energy transmitted to the closing unit 2 by this energy source, i.e. by the RFID reader, can, if the electrical energy supply arrangement 7 of the closing unit 2 has an electrical short-term interim energy storage device, be stored on an interim basis for a short time, to be used for directly subsequent procedures of the closing unit 2. The closing unit 2 is without energy during the remaining time, with the resulting advantages, as they have already been described above, as compared with battery-supplied closing systems or those supplied by a local energy supply network.

The actuator 5, which is also called an actuator, is configured, for example, as an electric motor, as an electromagnet or as a piezo-element, i.e. as a piezo-actuator. With such actuators 5, a small construction and energy-saving operation are possible, so that the electrical energy transmitted by the RFID is sufficient for their operation. The suitable embodiment of the actuator 5, in each instance, is to be used, depending on the configuration of the closing unit 2 and depending on whether the locking and unlocking unit of the lock 3 is supposed to be actively moved or only blocked and released by the actuator 5.

By means of this closing unit 2, the closing apparatus 1, and a method for unlocking and/or locking of the lock 3 by means of the closing apparatus 1, the reliability of closing systems based on transponder technology is significantly improved, and, at the same time, the total costs for such closing systems are significantly reduced, without the security for control of access monitoring being thereby impaired as compared with known solutions. For this purpose, the closing unit 2 also called a passive crypto-actuator is used, which is generally situated in the lock 3, or, in the case of a door 14, can; also be installed in a wall next to the door 14. In the example shown in FIG. 2, the closing unit 2 is directly integrated into the lock 3 of the door 14. This passive crypto-actuator works passively, in other words does not require any additional energy source and therefore no cable connections as in the case of online systems known from the state of the art. The energy supply takes place, as is known in transponder technology, by way of the electromagnetic alternating field of the reader 4.

The closing unit 2 can, for example, be disposed not only on and/or in a lock 3 of a door 14, the arrangement shown here, but also, for example, on and/or in a suitcase lock, safe lock, bicycle lock or in a great number of other closing units. By means of the very small construction that is made possible, and because no separate energy supply, for example by a battery or a supply network connection is required, very many possibilities of use in the most varied closing units are possible.

The electrical energy emitted to the closing unit 2, more precisely stated to its passive RFID basic circuit 11, by induction, by means of electromagnetic waves emitted by the RFID reader, can, as has already been described, be capacitatively stored in an electrical short-term interim energy storage device of the electrical energy supply arrangement 7 of the closing unit 2, preferably configured as a capacitor, particularly stored capacitatively on an interim basis, for a short time. For this purpose, the electrical energy supply arrangement 7 of the closing unit 2 advantageously comprises at least one such capacitor, which, as has already been described, has a capacity of greater than 100 nF, as a practical measure. Alternatively or additionally, the electrical energy supply arrangement 7 of the closing unit 2 can, for example, also comprise at least one electrical short-term interim energy storage device, configured as a rechargeable battery, for energy storage.

The reader 4, i.e. a transponder reader, also called an RFID reader or RFID reader is now used as a key for this closing system. The reader 4 is advantageously integrated into a mobile electronic device, particularly into a mobile communications device, e.g. a mobile telephone, smartphone, PDA (i.e. into a small portable computer), or the like. In general, a transponder reader is significantly more expensive than a transponder; however, mobile devices are also available that already have an integrated transponder reader as standard equipment. This general trend is significantly promoted by the spread of Near Field Communication Technology (NFC), which is based on a special application of RFID transponder technology and works at a carrier frequency of 13.56 MHz. By means of special software for key operation or key management, such a mobile communications device can be used as a key for the passive crypto-actuator, i.e. for the closing unit 2, and this leads to a significant cost reduction for the overall system, i.e. the closing apparatus 1, because no further costs are incurred for the reader 4.

The system known from the state of the art and used until now, in which the transponder is the key and the transponder reader device is the lock, is therefore completely reversed. The electronic circuit parts of the closing unit 2 are integrated into multiple semiconductor chips or, particularly advantageously, into one semiconductor chip. The semiconductor chip is advantageously what is called an ASIC (application-specific integrated circuit), i.e. an application-specific integrated circuit, also called a Custom Chip. This is a cost-advantageous solution and furthermore demonstrates great security, because the function of the ASIC cannot be manipulated.

The essential thing is that the electronic circuit of the closing unit 2, including the cryptographic encryption, i.e. the encryption/decryption unit 9 and the key memory 10, as well as including the locking or blocking apparatus 6, is situated in a stable housing 13 that cannot be opened without destroying it, and encapsulated by this housing, so that unauthorized opening of the lock 3 is not possible. The locking or blocking apparatus 6 is passed out of this housing 13, in order to move or at least block and release the locking and unlocking unit of the lock 3 by means of a movement of the locking or blocking apparatus 6 by means of the actuator 5.

For example, the housing 13 could be made of metal and lined with a plastic, for example cast epoxy resin. In a particularly advantageous embodiment shown in FIGS. 2 and 4, the antenna 12 for contact-free data transmission is the only component not situated in this robust housing 13, because it serves only as a transmission medium and is not security-relevant. In the case of a door lock, the antenna 12 can advantageously be integrated into a door knob 15, which is made of plastic or wood, for example, as shown in FIG. 2, because here it is placed as far as possible from the metal of the housing 13 as well as of the lock 3, which would have a negative influence on contact-free transmission between the reader 4 and the antenna 12.

Particularly in the case of doors 14, it is advantageous to dispose the antenna 12 in such a manner that it runs along both sides of the door, or to use two antennas 12, one antenna 12 on each side of the door, respectively, for example an antenna 12 in each door knob 15. In this manner, good communications contact between the reader 4 and the closing unit 2 is ensured. It is true that if the door knob 15 is broken off, the antenna 12 would be removed from the closing unit 2, but this could not lead to unauthorized opening of the door.

Alternatively, the antenna 12 can also be integrated into the housing 13 that is made of metal, as shown in FIG. 5. This, however, would generally lead to a great reduction in the transmission distance.

In a method for unlocking and/or locking of the lock 3 by means of such a closing apparatus 1, the reader 4 must be brought into the functional range of the antenna 12 of the closing unit 2 and activated. For example, the mobile communications device is brought into the functional range of the antenna 12 of the closing unit 2, and the reader 4 integrated into the mobile communications device is activated, for example by means of activation of a keypad function or by means of constant polling, i.e. by means of a constant search for an RFID transponder. Subsequently, a bidirectional communications connection 16 is established between the reader 4 and the closing unit 2. This communication generally begins with authentication of the reader 4, i.e. the reader 4 must prove that access to the data memory and/or the switch 8 of the closing unit 2 is permitted. For this purpose, the methods generally used in transponder technology are used, for example password or challenge/response methods. For this purpose, a key generated by the reader 4 is transmitted to the closing unit 2 and compared with a key from the key memory 10 in the encryption/decryption unit 9.

Optionally, authentication of the closing unit 2 with regard to the reader 4, in other words reciprocal authentication of both partners, can also be implemented. After successful authentication, subsequently the switch 8 can be activated, i.e. closed, by means of a further communication 17, which can even be encrypted once again, cryptographically, in order to increase security. Only then is the electrical energy of the energy supply arrangement 7 passed to the actuator 5 by way of the closed switch 8, so that the actuator 5 activates the locking or blocking apparatus 6 of the closing unit 2 and thereby activates the latch of the lock 3, i.e. the locking and unlocking unit of the lock 3, in other words actively moves it, or merely releases it. If the locking and unlocking unit of the lock 3 is merely blocked by the locking or blocking apparatus 6 of the closing unit 2, then the door 14 can now be opened, for example by means of activation, for example turning, of the door knob 15.

In another exemplary embodiment, shown in FIG. 6, a key for authentication of the reader 4 with regard to the closing unit 2 is situated not in the reader 4 itself, but rather in a separate transponder 18, and is merely transmitted by the reader 4, for example by the mobile communications device configured as a mobile telephone or PDA. In this case, the reader 4 communicates not only with the closing unit 2 but also, by way of a further communications connection 19, with the separate transponder 18. In this manner, no encryption function is required in the reader 4 itself; this function is restricted to the separate transponder 18. In this embodiment of the closing apparatus 1, the reader 4 serves merely as a transmission apparatus for the key data, using an anti-collision function, by way of the RFID interface.

In this exemplary embodiment, shown in FIG. 6, it is therefore not necessary to store the key matching the closing unit 2 key in the reader 4, but rather this key and possibly also a corresponding encryption unit are stored in the separate transponder 18, so that the key is merely transmitted to the closing unit 2 by the reader 4. This embodiment is suitable, for example, for closing units 2 that are used by a great number of users only for a short period of time, in each instance, for example for closing units 2 that are disposed in and/or on locks 3 of hotel room doors. Then it is not necessary to transmit the key that matches the respective closing unit 2 to a private reader 4 of a respective user, configured as a mobile telephone, for example, and to delete it again after expiration of a respective period of use. In this embodiment of the closing apparatus 1, instead, issuance of the separate transponder 18 that matches the respective closing unit 2 to the user is sufficient; the user can then use his mobile telephone as a reader 4 for transmission of the key from the separate transponder 18 to the closing unit 2, and for opening and locking the lock 3, which is made possible in this manner.

For transmission of the key from the separate transponder 18 to the closing unit 2, the closing unit 2, more precisely stated its antenna 12, and the separate transponder 18 must be situated in the RFID field of the reader 4 at the same time, for example, so that the bidirectional communications connection 16 between the reader 4 and the closing unit 2 as well as the further communications connection 19 between the reader 4 and the separate transponder 18 can be established, at the same time, and the key can be transmitted, by way of these communications connections 16, 19, from the separate transponder 18, by way of the reader 4, to the closing unit 2. After successful authentication, the switch 8 is activated, i.e. closed by means of the further communication 17, which can also be cryptographically encrypted once again, to increase the level of security. Only then is the electrical energy of the energy supply arrangement 7 passed to the actuator 5, by way of the closed switch 8, so that the actuator 5 activates the locking or blocking apparatus 6 of the closing unit 2 and thereby activates the latch of the lock 3, i.e. the locking and unlocking unit of the lock 3, in other words actively moves it or merely releases it, in order to subsequently be able to activate it manually.

In a further possibility of this embodiment of the closing apparatus 1, the key is transmitted to the reader 4 by radio, i.e. by way of a contact-free data transmission that deviates from RFID, for example Bluetooth, and transmitted by the latter to the closing unit 2, in practical manner by way of the RFID interface.

A significant advantage of the embodiment of the closing unit 2 without its own internal energy supply by means of a battery or coupling to a local supply network is its very great reliability, which is comparable to that of a mechanical lock. Failure due to a dead battery cannot occur, and therefore does not require any special precautions, which would reduce the security level. Because of the passive construction, the circuit of the closing unit 2 is almost never under voltage and in operation; there are therefore hardly any aging processes that could lead to failures. Failure of the closing unit 2 is therefore no more likely than failure of a mechanical lock, for example due to the key breaking off.

The functional reliability and ease of operation of the lock 3 or the closing unit 2 can be further improved if the closing unit 2 has a sensor for monitoring movement or blocking and release of the locking and unlocking unit of the lock 3. For example, the sensor monitors the actuator 5 and/or the movement of the locking or blocking apparatus 6 of the closing unit 2 and/or the movement of the locking and unlocking unit of the lock 3 directly. A respective sensor result can be transmitted to the reader 4 by way of the contact-free communications interface, and displayed to a respective user on the latter or on the mobile communications device on which the reader 4 is installed. In this manner, it can be immediately recognized whether the actuator 5 was actually activated and thereby the locking and unlocking unit of the lock 3 has been released. For example, a reed sensor, i.e. a reed contact, which is activated only in the event of a correct movement of the actuator 5 and/or of the locking or blocking apparatus 6 and/or the locking and unlocking unit of the lock 3 and passes a corresponding sensor signal on to the reader 4, by way of the circuit of the closing unit 2, can be used as a sensor.

Alternatively or additionally, the closing unit 2 can have an optical, acoustical and/or haptic output unit for output of the sensor result of the sensor, so that the sensor result, i.e. the signal of the sensor, can be output to the user by way of the optical, acoustical and/or haptic output unit of the closing unit 2. Such an optical output unit has a light-emitting diode (LED), for example, or a plurality of light-emitting diodes. It is practical if the optical, acoustical and/or haptic output unit and, if necessary, also the sensor are supplied with electrical energy by way of the reader 4, analogous to the other components of the closing unit 2, so that no separate energy source is required for this purpose, either.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A closing unit for a lock, the closing unit comprising:
an actuator for moving or for blocking and releasing a locking and unlocking unit of the lock;
an electrical energy supply arrangement;
a switch arranged between the electrical energy supply arrangement and the actuator, the switch being supplied with electrical energy from the electrical energy supply arrangement and providing the electrical energy to the actuator to actuate the actuator;
an encryption/decryption unit;
a key memory; and
a passive RFID basic circuit having an antenna, the passive RFID basic circuit providing the electrical energy to the electrical energy supply arrangement,
wherein at least the actuator, the switch between the electrical energy supply arrangement and the actuator, the encryption/decryption unit, and the key memory are arranged in a housing that cannot be opened without destroying it,
wherein the passive RFID basic circuit of the closing unit is supplied with the electrical energy only via an RFID reader,
wherein the energy transmission from the RFID reader to the closing unit is performed via induction,
wherein the closing unit is provided with a single interface that enables locking and unlocking of the lock in an entirely contactless manner, the passive RFID basic circuit forming the single interface, and
wherein the electrical energy supply arrangement comprises at least one electrical short-term interim energy storage device, the short-term interim energy storage device being a capacitor.

2. The closing unit according to claim 1, wherein the actuator is configured as an electric motor, as an electromagnet, or as a piezo-element.

3. The closing unit according to claim 1, further comprising a sensor for monitoring movement or for blocking and releasing the locking and unlocking unit of the lock.

4. The closing unit according to claim 3, further comprising an optical, acoustical and/or haptic output unit for output of a sensor result of the sensor.

5. The closing unit according to claim 1, wherein the housing is made of metal and/or plastic.

6. A closing apparatus comprising at least one RFID reader and at least one closing unit according to claim 1.

7. The closing apparatus according to claim 6, wherein the RFID-reader is configured as a mobile communications device or integrated into a mobile communications device.

8. The closing apparatus according to claim 6, further comprising a separate transponder having a key for authentication of the RFID-reader with respect to the closing unit.

9. A method for unlocking and/or locking of a lock via a closing apparatus according to claim 6, the method comprising:
establishing a bidirectional communications connection between the RFID-reader and the single interface of the closing unit;
transferring said electrical energy from the RFID-reader to the closing unit,
performing an authentication, wherein the RFID-reader authenticates itself with regard to the closing unit; and
activating, after successful authentication, the switch of the closing unit using the electrical energy transmitted from the RFID-reader, in order to move or to block and release the locking and unlocking unit of the lock via the actuator,
wherein the single interface enables the unlocking and/or locking of the lock in an entirely contactless manner.

10. The method according to claim 9, wherein the RFID-reader authenticates itself with regard to the closing unit via a key that is transmitted to the RFID-reader by a separate transponder and to the closing unit by the RFID-reader via the single interface.

11. The closing unit according to claim 1, wherein the single interface enables authentication of the RFID reader.

* * * * *